Dec. 9, 1952   W. H. SILVER ET AL   2,620,715
TRACTOR MOUNTED IMPLEMENT
Filed June 15, 1946   3 Sheets-Sheet 3
FIG. 3
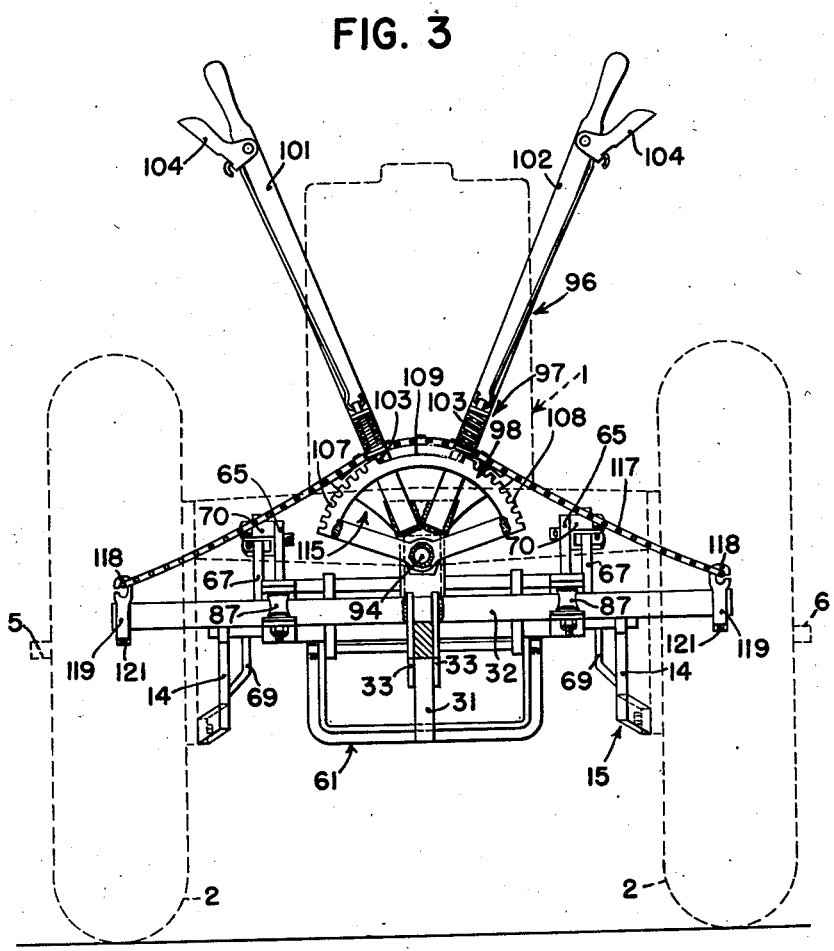
INVENTORS
WALTER H. SILVER
WILLIAM V. LOHRMAN
BY 
ATTORNEYS Patented Dec. 9, 1952

2,620,715

UNITED STATES PATENT OFFICE 2,620,715

TRACTOR MOUNTED IMPLEMENT

Walter H. Silver, Moline, Ill., and William V. Lohrman, Davenport, Iowa, assignors to Deere & Company, Moline, Ill., a corporation of Illinois Application June 15, 1946, Serial No. 676,870

7 Claims. (Cl. 97—47)

The present invention relates generally to agricultural implements and more particularly to ground working tools, such as plows, listers, middlebreakers and the like.

The object and general nature of the present invention is the provision of a tractor mounted implement, such as a lister, especially constructed and arranged to be easily and quickly shifted laterally of the tractor to bring the ground working tool into a position adjacent one or the other of the rear wheels of the tractor. An arrangement of this kind is very desirable when the implement is mounted on one of the smaller type tractors where the rear wheels are usually incapable of being adjusted sufficiently far apart to span the distance between two rows, as when blanking or listing, in which case it is necessary to have both of the rear tractor wheels run on the unworked land and to shift the lister bottom relative to the tractor laterally over into a position a desired distance from the last row previously worked. The present invention achieves this result in a novel and expeditious manner.

Another important feature of this invention is the provision of an implement of this kind which can be easily and quickly attached to or detached from the propelling tractor, and it is a further feature of this invention to provide new and improved means whereby the lateral shifting of the tool may be easily and quickly accomplished by a means which is detached or attached with the implement but which is readily accessible to the operator of the tractor when the implement is properly connected in operative relation with the tractor.

These and other objects and advantages of the present invention will be apparent to those skilled in the art after a consideration of the following detailed description, take in conjunction with the accompanying drawings, in which Figure 1 is a side view of a tractor mounted implement in which the principles of the present invention have been incorporated;

Figure 3 is a rear view.

Figure 1:
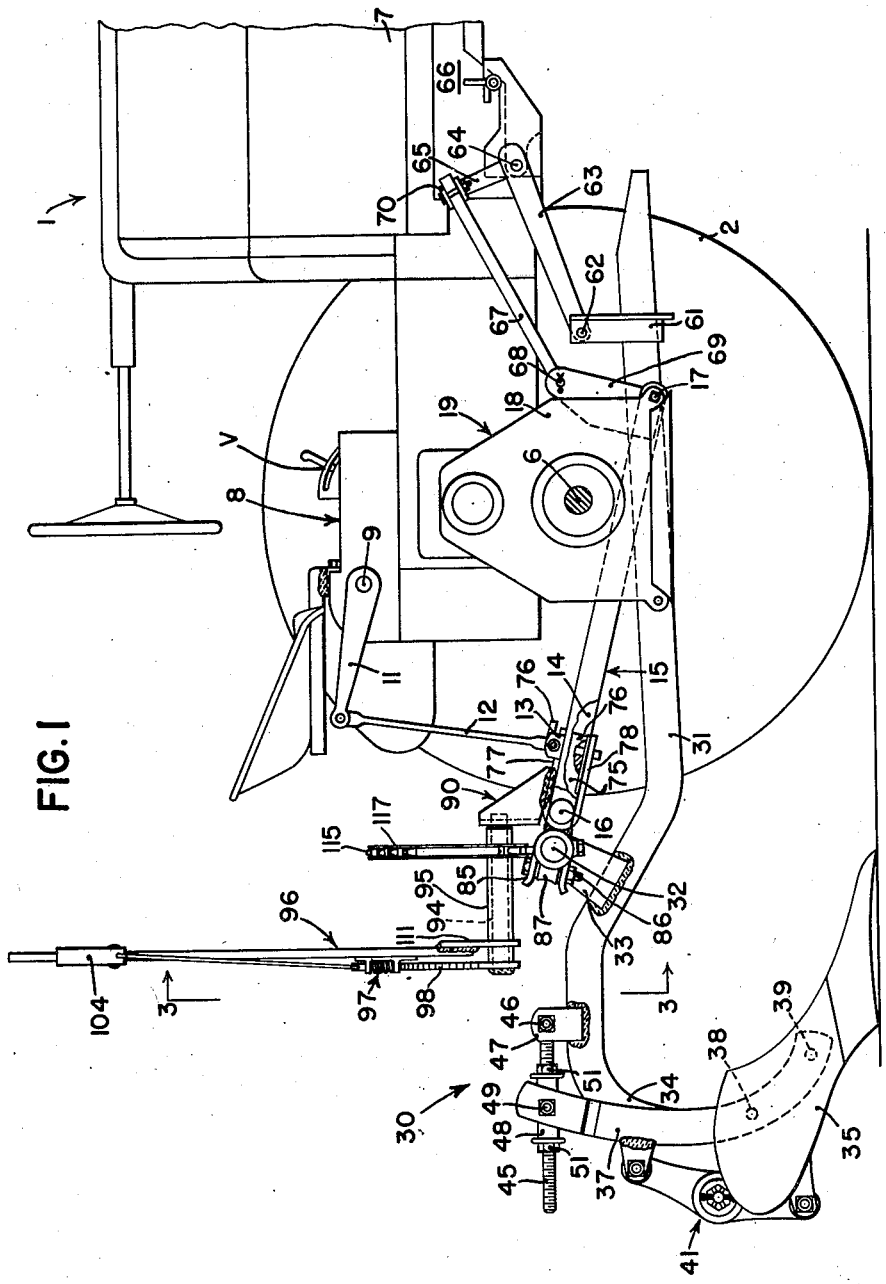

Referring now to the drawings, the reference numeral 1 indicates a farm tractor having front dirigible wheels and rear traction wheels 2 fixed, as by clamps, to axle means 5 and 6. The tractor includes a power plant 7 and a power lift unit 8 of the hydraulic type, having suitable valve mechanism V and other necessary parts for controlling the operation of a power lift shaft 9. A pair of lift arms 11 are fixed to the rockshaft 9 and extend rearwardly, and the rear ends of the lift arms 11 are connected by links 12 to lugs 13 formed on the side members 14 of a generally vertically swingable tractor drawbar or bail member 15. The latter is preferably in the form of a U-shaped member, considered as a whole, and includes a rear transverse section 16 which may be formed of round stock. The sides 14 may be strap members, and the latter are pivoted at their front ends, as at 17, to the drop housings 18 which form a part of the tractor rear axle structure 19. Preferably, the rear part 16 of the tractor drawbar is welded or otherwise permanently secured to the side members 14. When the valve V is in a neutral position, the rockshaft 9 is locked hydraulically against movement in a direction to permit the drawbar 15 to lower, and when the valve V is moved in one direction the drawbar 15 may be lowered, and when the valve V is moved in the other direction fluid under power is directed into the cylinder forming a part of the unit 8 for swinging the lift arms 11 upwardly, thus acting through the links 12 for raising the tractor drawbar 15.

One of the implements that may readily and quickly be attached to and detached from the tractor 1 is a two bottom lister, indicated in its entirety by the reference numeral 30. The implement 30 includes a tool bar 31 extending generally longitudinally of the tractor and a part in the form of a transverse attaching bar 32 which is rigidly fixed to the rear portion of the tool bar 31, as by a pair of lugs 33 welded to the tool bars 31 and 32. These bars constitute a tool beam, the rear portion 34 of which curves downwardly and receives a ground working tool in the form of a lister bottom 35. The latter preferably is fixed to a pair of standards 37 which are pivotally connected, as at 38, to the lower end of the tool beam portion 34, and the lister bottom 35 is, in turn, pivotally connected, as at 39, to the lower ends of the standards 37. Suitable overload release linkage 41 is employed for holding the lister bottom 35 in operative position against all normal loads. The standards 37 are adjustably fixed in position relative to the tool beam by means of a threaded link 45 pivotally connected at 46 to a pair of lugs 47 carried by the rear portion of the tool bar 31, the threaded portion of the connecting link 45 extending through a swivel member 48 which is pivoted at 49 to the upper ends of the standards 37. A pair of lock nuts 51 serve to lock the swivel 48 on the link 45, and by loosening the lock nuts 51 and turning one or the other, the point or nose of the lister bottom 35 may be raised or lowered in order to adjust the amount of suck.

In addition to the power lift unit 8 and associated parts described above, the tractor 1 includes a generally vertically arranged forwardly disposed bar-receiving bail 61. This member constitutes a vertically shiftable part and preferably is in the form of a U-shaped part pivotally connected, as at 62, to the rear ends of a pair of arms 63 that are fixed at their forward ends to a transverse shaft member 64, and the lower central portion of the bail constitutes a tool beam receiving section which, as best shown in Figure 3, extends laterally and along which the forward portion of the beam 31 is shiftable generally from one side of the tractor to the other. The shaft member 64 includes one or more arm extensions 65 and is mounted for rocking movement in a pair of attaching plates 66 which, while normally detachable from the tractor 1, usually is carried by the tractor. The upper end of each of the arm extensions 65 is pivoted, as at 70, to the forward end of a link 67, the rear end of which is pivoted at 68 to an arm or bracket 69 that is fixed to the adjacent forward portion of the tractor drawbar 15. Thus, whenever the drawbar 15 is raised or lowered, the vertically shiftable bail 61 is also raised and lowered, approximately the same amount. It will be noted that the front end of the tool bar 31 rests loosely in the bail 61 and that when detaching the implement 30, the front end of the tool bar 31 may readily be withdrawn from the bail 61.

The transverse section 16 of the tractor drawbar bail 15 is provided with a forwardly extending lug 75 which has an aperture at its forward end to receive a quick detachable pin 76 that is adapted to be inserted through openings in the forward ends of upper and lower attaching lugs 77 and 78 which are fixed to a generally transversely arranged attaching member 80. The latter member includes a part in the form of a U-shaped drawbar-receiving saddle section 81 having a forwardly facing socket adapted to receive the drawbar section 16, the apertured forwardly extending lugs 77 and 78 being welded to the forward flanges of the U-shaped member 81. Generally rearwardly extending U-shaped lugs 84 and 85 are welded to the rear side of the socket member 81, and these lugs 84 and 85 form a pair of laterally spaced rearwardly facing socket sections adapted to pivotally receive the transverse bar 32 forming a part of the tool beam. Quick detachable pins, similar to the pin 76 mentioned above, may be employed for releasably holding the transverse bar in the laterally spaced socket sections 84 and 85, but preferably, we employ bolts 86 and rollers 87, as best shown in Figure 1. The attaching bar 32 constitutes a member that is shiftably mounted on the tractor drawbar through the attaching member 80, and these members, together with associated parts, constitute means for mounting the rear portion of the tool bar or tool beam on the tractor drawbar for lateral shifting movement relative thereto. More specifically, the socket member 81, the pin 76, and associated parts constitute means for detachably connecting the transverse bar 32 with the tractor drawbar 15.

Figure 2:
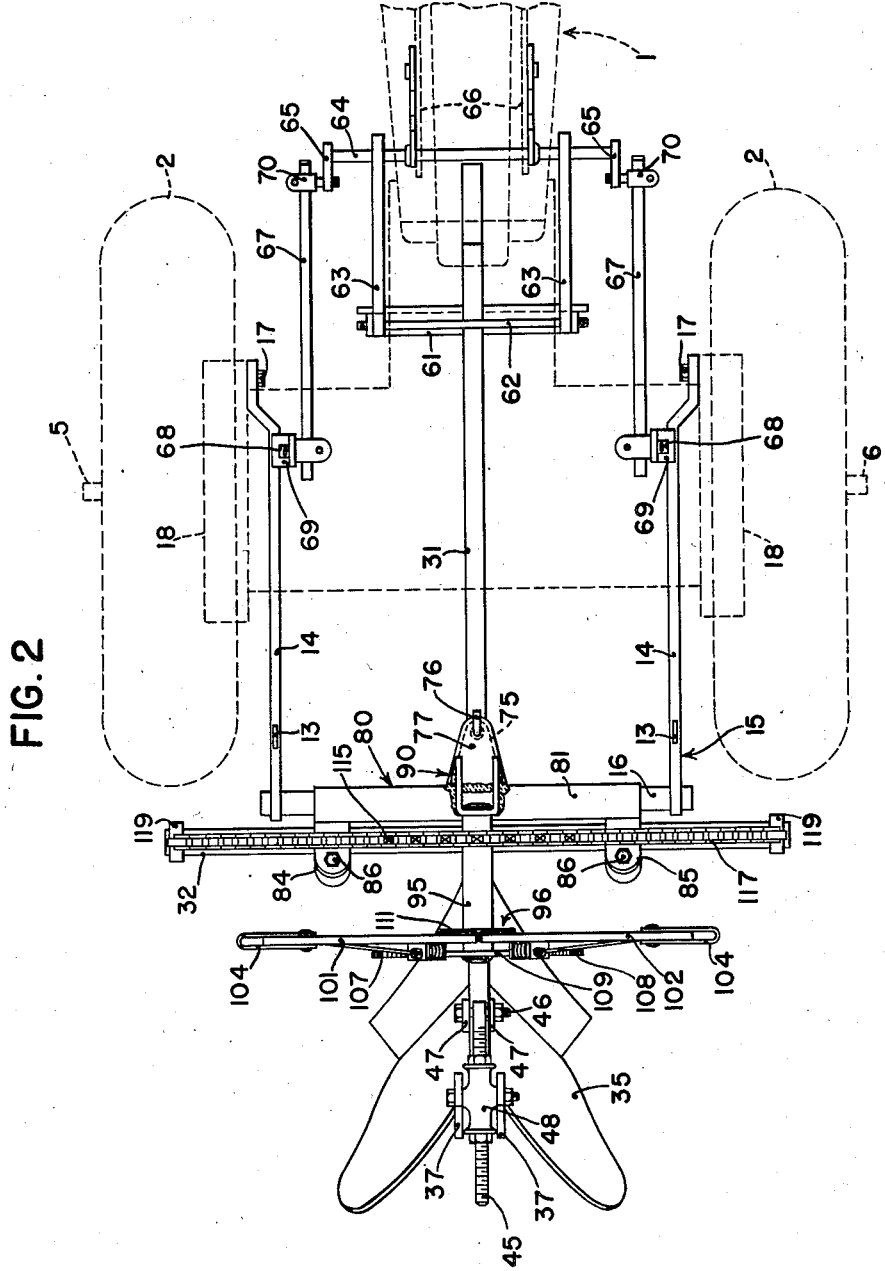
Figure 2 is a plan view of the implement shown in Figure 1.

A bracket 90 is carried by the attaching member 80, the bracket 90 consisting of a U-shaped part welded to the upper flange of the member 81 and to the upper lug 77, as best shown in Figure 2. Secured, as by welding, to the bracket 90 is a rearwardly extending stub shaft 94, and a sleeve 95 is mounted for rocking movement on the stub shaft 94. A hand lever 96 is secured, as by welding, to the rear portion of the sleeve 95, and the hand lever 96 carries conventional detent mechanism 97 which operates in conjunction with a notched sector 98 that is welded or otherwise fixed to the rear end of the stub shaft 94. The hand lever 96, as best shown in Figure 3, comprises two hand lever sections 101 and 102, each having detent mechanism 97 and a detent pawl 103. A hand grip 104 is mounted on each of the hand lever sections 101 and 102 and is link connected to operate the associated pawl 103. The sector 98 that is fixed to the stub shaft 94 is provided with two notched sections 107 and 108, separated by a dwell portion 109 which is even with or below the bottoms of the notches 107 and 108. This dwell portion 109 has an angular extent that corresponds to the angle between the two lever sections 101 and 102, it being understood that these sections are rigidly connected together, as by being welded to a plate 111 (Figure 1), that is fixed to the sleeve 94. A toothed member 115, preferably in the form of a segment of a sprocket gear or the equivalent, is fixed, as by welding, to the forward portion of the sleeve 95 and receives a transversely arranged sprocket chain 117, the ends of which are engaged into hook sections 118 formed on collars 119 that are secured, as by set screws 121, to the outer ends, respectively, of the transverse tool beam bar 32. As best shown in Figure 3, when the beams 31, 32 are in a neutral position, which positions the lister bottom 35 in a middle position between the two tractor wheels 2, the two detents 103 of the two hand lever sections 101 and 102 lie in the dwell portion 109 of the sector 98, immediately adjacent the two sets of notches 107 and 108. If it should be desired to shift the lister bottom either in one direction or the other, one or the other of the hand lever sections 101 and 102 is grasped, the associated hand grip 104 depressed to withdraw the associated detent 103, after which the hand lever section may be swung downwardly, and in so doing the gear sector 115 is swung in that direction, thus shifting the chain 117 and effecting a transverse adjustment of the plow beams 31, 32, the transverse bar 32 shifting laterally in the laterally spaced apart sections 84 and 85. The hand lever 96 thus constitutes a part that is supported on the tractor drawbar through the attaching member 80 and is connected through the chain 117 and associated parts with the tool beam. Thus, the member 115 and the chain 117, together with associated parts, constitute motion transmitting means extending between the hand lever 96 and the tool beam 31 for shifting the latter relative to the tractor drawbar and bail.

Figure 1 shows the implement in operating position, and the depth of operation may be increased or decreased by suitable manipulations of the valve V, which lower both the forward bail 61 and the tractor drawbar 15. When it is desired to raise the implement into a transport position, it is not necessary to restore the plow beam to its intermediate position, as shown in Figure 3, it being necessary merely to operate the valve V and cause the power lift unit 8 to raise the tractor drawbar 15, which also effects a raising of the bail 61 through the linkage 63, 65 and 67. Upward movement of the bail 61 serves to rock the tool beam 31 relative to the attaching member 80 on the tractor drawbar 15, the attaching bar 32 rocking in the lugs 84 and 85.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. The combination with a tractor having a rear vertically shiftable drawbar and a forward vertically shiftable part, of an agricultural implement comprising a tool bar extending generally longitudinally of the tractor, a transverse attaching bar fixed thereto, means on the vertically shiftable part to receive and support the forward end of said tool bar, a support shiftably receiving said transverse bar, means detachably connecting said support with said tractor drawbar, and a part movable on said support and connected with said transverse bar for shifting the latter and said tool bar laterally of the tractor.

2. An agricultural implement adapted to be connected with a tractor having a rear vertically swingable drawbar and means for swinging said drawbar, said implement comprising a support adapted to be detachably connected with said drawbar and including forwardly extending upper and lower sections adapted to embrace said drawbar, attaching means connecting said sections forward of said drawbar for detachably connecting said support with said drawbar, said support also including a pair of rearwardly extending laterally spaced bar-receiving guides, a bar rockable and slidable in said guides and extending transversely thereof, means carried by said support for releasably holding said bar in said guides, a ground working tool carried by said bar, means carried by said support and connected with said bar for shifting the same laterally, and means connected with the ground working tool for rocking the latter and said bar relative to said drawbar-carried support.

3. An agricultural implement comprising a support including a pair of laterally spaced bar-receiving guides, a bar slidable in said guides and extending transversely thereof, a bracket on said support having a rearwardly extending stub shaft, a sleeve mounted for rocking movement thereon, a toothed member fixed to the forward end of said sleeve, means connected with the rear end of said sleeve for rocking said sleeve and said toothed member, and a chain trained over said toothed member and connected at its opposite ends, respectively, with the opposite ends of slidable bar.

4. An agricultural implement comprising a generally longitudinally extending tool bar, a transverse bar fixed thereto, an attaching member comprising a part slidably receiving said transverse bar, a bracket fixed to said attaching member, a stub shaft fixed to said bracket, a notched sector fixed to said stub shaft, a sleeve mounted for rotation on said stub shaft, a toothed member fixed to the forward portion of said sleeve, sprocket chain means trained over said toothed member and connected at its opposite ends with said transverse bar, and lever and detent means connected with the rear portion of said sleeve and cooperating with said notched sector for adjustably fixing the lateral position of said tool bar relative to said attaching member.

5. An agricultural implement comprising a generally longitudinally extending tool bar, a transverse bar fixed thereto, an attaching member comprising a part slidably receiving said transverse bar, a bracket fixed to said attaching member, a part rockably mounted on said bracket, and motion-transmitting means connected with said part and with said transverse bar at opposite ends thereof for adjusting the lateral position of said tool bar relative to said attaching member.

6. In combination, a tractor having a rear drawbar and a forwardly disposed bail, the latter having a laterally extending section and the drawbar having a transverse section disposed rearwardly of said bail section, a generally longitudinally extending tool bar having its forward end carried to lateral movement on the laterally extending section of said bail, a transvers bar on the rear portion of said tool bar, a mounting member slidably receiving said transverse bar and adapted to be connected to the transverse section of the tractor drawbar, and means on said mounting member and connected with said transverse bar for shifting said tool bar laterally relative to said mounting member and said forwardly disposed bail.

7. In combination, a tractor having a rear drawbar and a forward bail, both generally vertically swingable, a ground working implement comprising a tool beam adapted to be disposed longitudinally of the tractor with its forward end received by and shiftable laterally relative to said bail, an attaching member receiving said tool beam for lateral shifting relative to said member, drawbar-receiving means on said attaching member, and means releasably connecting said drawbar-receiving means to the tractor drawbar, a laterally swingable lever mounted on said drawbar-receiving means, and motion-transmitting means extending between said lever and said tool beam, whereby movement of said lever serves to shift said tool beam relative to said tractor bail and said drawbar.

WALTER H. SILVER.
WILLIAM V. LOHRMAN.

REFERENCES CITED

The following references are of record in the file of this patent:

UNITED STATES PATENTS

| Number | Name | Date |
|---|---|---|
| 132,772 | Owen | Nov. 5, 1872 |
| 179,545 | Evans | July 4, 1876 |
| 205,827 | Berdan | July 9, 1878 |
| 225,156 | Miller | Mar. 2, 1880 |
| 232,505 | Hunt | Sept. 21, 1880 |
| 238,993 | VanDeMark | Mar. 15, 1881 |
| 280,015 | Daniels et al. | June 26, 1883 |
| 282,929 | Runk | Aug. 7, 1883 |
| 306,342 | Meagher et al. | Oct. 7, 1884 |
| 1,253,943 | Crawford | Jan. 15, 1918 |
| 1,256,349 | Mertz | Feb. 12, 1918 |
| 1,736,575 | Bonnel | Nov. 19, 1929 |
| 1,888,876 | Mehan | Nov. 22, 1932 |
| 1,902,845 | Graham et al. | Mar. 28, 1933 |
| 2,339,225 | Strandlund | Jan. 11, 1944 |
| 2,341,179 | Hipple | Feb. 8, 1944 |
| 2,352,276 | Lindgren | June 27, 1944 |

FOREIGN PATENTS

| Number | Country | Date |
|---|---|---|
| 543,659 | Great Britain | Mar. 6, 1942 |
| 727,526 | France | Mar. 29, 1932 |